(12) United States Patent
Zanini

(10) Patent No.: US 10,137,815 B2
(45) Date of Patent: Nov. 27, 2018

(54) TOWABLE ELECTRIC SWEEPER, DUMPSTER, AND POWER SOURCE

(71) Applicant: Arthur Zanini, Highland, CA (US)

(72) Inventor: Arthur Zanini, Highland, CA (US)

( * ) Notice: Subject to any disclaimer, the term of this patent is extended or adjusted under 35 U.S.C. 154(b) by 615 days.

(21) Appl. No.: 14/827,057

(22) Filed: Aug. 14, 2015

(65) Prior Publication Data
US 2016/0046225 A1 Feb. 18, 2016

Related U.S. Application Data

(60) Provisional application No. 62/037,588, filed on Aug. 14, 2014.

(51) Int. Cl.
*B60P 1/34* (2006.01)
*B60P 1/28* (2006.01)
*E01H 1/05* (2006.01)
*E01H 1/04* (2006.01)

(52) U.S. Cl.
CPC .............. *B60P 1/283* (2013.01); *E01H 1/045* (2013.01); *E01H 1/053* (2013.01); *E01H 1/056* (2013.01); *B60P 1/34* (2013.01)

(58) Field of Classification Search
CPC ........... E01H 1/056; E01H 1/053; B60P 1/283
USPC ...................................................... 15/83, 81
See application file for complete search history.

(56) References Cited

U.S. PATENT DOCUMENTS

| 172,454 A * | 1/1876 | Kramer | B60P 1/283 280/29 |
| 1,390,122 A * | 9/1921 | Gilbert | B62B 1/24 298/1 R |
| 1,497,489 A * | 6/1924 | Cochran | B60P 1/14 298/17.5 |
| 1,546,261 A * | 7/1925 | Spencer | B60P 1/14 298/22 F |
| 3,604,051 A * | 9/1971 | Wendel | E01H 1/0854 15/340.4 |
| 4,328,603 A * | 5/1982 | Dickson | E01H 1/042 15/84 |

(Continued)

OTHER PUBLICATIONS

Victory Sweepers, Inc., The Victory T600: America's Leading Low Cost Sweeper Gets Even Better!, Website: http://www.victorysweepers.com/products/t600.html.

(Continued)

*Primary Examiner* — Michael Jennings
(74) *Attorney, Agent, or Firm* — Kenneth Avila

(57) ABSTRACT

Disclosed is a versatile trailer that may be towed from job site to job site by a vehicle and within a job site be towed by a maintenance cart. The trailer may function as a mobile sweeper to clean smaller parking lots found at schools and parks as well as sweep pathways, lawns, and sidewalks to remove litter, debris, and plant waste. The trailer contains a hopper to collect material both swept by the broom from the area below the trailer as it is towed as well as allowing material to be deposited into the hopper from above the trailer. The hopper is designed so as to allow any material contained within the hopper to be deposited onto the ground or into a dumpster. Finally the trailer is designed so that the electrical power source used to operate the broom and the hopper lift mechanism may be concurrently used by maintenance workers to supply electrical energy needed to operate any electrically based power tools and equipment.

6 Claims, 10 Drawing Sheets

(56) References Cited

U.S. PATENT DOCUMENTS

| | | | | |
|---|---|---|---|---|
| 4,557,010 A * | 12/1985 | Rosseau | ............ | E01H 1/056 15/83 |
| 5,580,134 A * | 12/1996 | Allwine | ............ | B60P 1/34 298/11 |
| 6,409,275 B1 * | 6/2002 | Gerding | ............ | B60P 1/283 296/35.3 |
| 6,755,479 B1 * | 6/2004 | Meeks | ............ | B60P 1/06 298/17 B |
| 6,817,677 B1 * | 11/2004 | Beiler | ............ | B60P 1/34 298/21 R |
| 6,851,756 B2 * | 2/2005 | Pieschel | ............ | B60P 1/04 298/17 R |
| 7,055,878 B2 * | 6/2006 | Imhof | ............ | B60P 3/07 296/26.07 |
| 7,111,417 B1 * | 9/2006 | Bartlett | ............ | E01H 5/06 172/684.5 |
| 7,320,147 B2 * | 1/2008 | Eberle | ............ | A01G 20/43 15/79.1 |
| 7,396,201 B2 * | 7/2008 | Pollnow | ............ | B60P 1/025 414/482 |
| 8,215,717 B2 * | 7/2012 | Stewart | ............ | B60P 1/12 298/11 |
| 8,876,216 B2 * | 11/2014 | Stewart | ............ | B60P 1/08 298/11 |
| 9,340,138 B2 * | 5/2016 | Piekny | ............ | B60P 1/34 |
| 9,848,750 B1 * | 12/2017 | Watkins | ............ | A47L 11/22 |
| 2005/0253445 A1 * | 11/2005 | Beiler | ............ | B60P 1/16 298/22 C |
| 2008/0211289 A1 * | 9/2008 | Beiler | ............ | B60P 1/00 298/19 R |

OTHER PUBLICATIONS

Victory Sweepers, Inc., E600: The Amazing Pickup Ability of the T600 (But With Extremely Quiet Operation!), Website: http://www.victorysweepers.com/products/e600.html.

* cited by examiner

TOWABLE ELECTRIC SWEEPER, DUMPSTER, AND POWER SOURCE

CROSS-REFERENCE TO RELATED APPLICATIONS

This application claims priority from U.S. Provisional Patent Application No. 62/037,588 filed on Aug. 14, 2014. The entire disclosure of the prior application is considered to be part of the disclosure of the accompanying application and is hereby incorporated by reference.

BACKGROUND OF THE INVENTION

1. Field of the Invention

This invention concerns a towable apparatus on wheels for the sweeping of surfaces such as pavement and lawns; handling and transporting of materials such as waste, construction and landscaping components, earth, and the such; and the generation of electricity to supply electrically based power and landscaping tools such as saws, blowers, mowers, trimmers, drills, and the such. The apparatus includes a dust suppression system for use when sweeping; may be towed by a variety of vehicles such as gasoline powered trucks and cars, golf carts, and all-terrain vehicles (ATVs); and is adapted for use in small or confined areas.

2. Description of the Related Art

Maintenance workers responsible for maintaining the landscape or parking lots of homes with very large yards, churches, business parks, schools, city governments and other small to medium size facilities have a need for a multipurpose apparatus to transport tools, equipment, waste, trash, soil, fertilizers, construction materials, and such; sweep pathways, sidewalks, lawns, and parking lots of debris; and provide a source of electrical power in remote locations. These needs must be satisfied while keeping the apparatus small enough so that it may be easily maneuvered, lightweight so that it may be towed by maintenance carts or ATVs, and sufficiently silent so that it may be used about schools and business complexes without disturbing individuals. Currently a variety of specialized apparatus exists.

One such apparatus is the street sweeper as disclosed in multiple US patents. These vehicles typically have four wheels and carries a main broom of cylindrical configuration which is located under the vehicle's carriage. The main broom extends across the width of the vehicle, and is powered so that it rotates to lift any debris present on the pavement being swept into the vehicle itself for disposal in an appropriate location at some subsequent time. The typical street sweeping vehicle also includes a pair of side brooms, known in the trade as gutter brooms, which are designed to gather material from the sides of the vehicle and propel it inwardly so that it comes under the control of the main broom and is lifted into the vehicle and disposed of. Although a street sweeper may cover large areas of pavement such as the parking lots of schools and business parks in a short amount of time they are expensive to purchase and maintain. In addition street sweepers are not designed to sweep sidewalks and paved pathways. The street sweeper is too specialize of an apparatus for maintenance workers to take with them to a job site. Maintenance workers are also in need of an apparatus that may store equipment or materials for easy transport or disposal.

A number of specialized apparatuses for the easy transport of equipment or materials are disclosed as patents or in other publications. US Patent Publication 2005/0253445 titled "Self Propelled Trailer" discloses an embodiment of a towable trailer that may satisfy the aforementioned needs of maintenance workers. The Self Propelled Trailer contains a hopper with closed sides and a tailgate that may be used to store the materials that are to be transported or disposed of. The hopper is also mounted on a lift mechanism so that one end of the hopper may be raised into such a position so that any material contained within may, by simple gravitational forces, slide out of the hopper onto the ground. The Self Propelled Trailer, being also towable, may be easily transported from one job site to another and once at a job site the Self Propelled Trailer makes use of a small motor, gas or electrical, to allow a maintenance worker to maneuver the trailer to a position that may not otherwise be accessible to the vehicle towing the trailer. The motor also functions for tilting the hopper to such a height so that materials within the hopper may easily fall onto the ground. The use of a motor powered by a battery would make the Self Propelled Trailer "green" in that noise and air pollution are reduced or eliminated when maneuvering the trailer Although the Self Propelled Trailer facilitates the transport of landscape equipment, power tools, and materials within a job site it does not have the ability to sweep lawns, paved pathways, or parking lots of unwanted debris. The addition of a motor for maneuvering purposes does provide a benefit in that the Self Propelled Trailer may be moved from one location to another within a job site. However the size of the motor and the design of the steering mechanism makes this movement a slow and deliberate process thereby decreasing the effectiveness of the maintenance workers as they are not able to react to maintenance opportunities that present themselves about the job site. Furthermore the motor is dedicated to the operations of the Self Propelled Trailer requiring maintenance workers to carry with them a bulky and expensive power generator when operating electrically based power equipment. Finally the hopper, when disposing of any materials contained therein, may only dispose of the material on the ground requiring the maintenance worker to then lift the material into a dumpster. The Self Propelled Trailer is too specialize of an apparatus for maintenance workers to take with them to a job site.

Maintenance workers are in need of a versatile apparatus that may be towed from job site to job site by a vehicle and within a job site by a maintenance cart or ATV. The apparatus must be able to act as a mobile sweeper to clean smaller parking lots found at schools and parks as well as sweeping pathways, lawns, and sidewalks to remove litter, debris, and plant waste. The apparatus must have a hopper to collect material both swept by the broom from the area below the apparatus as well as allowing material to be deposited into the hopper by maintenance workers from above the apparatus. The hopper must be designed so as to allow any material contained within the hopper to be deposited onto the ground or into a dumpster. Finally the apparatus must be designed so that the power source used to operate the broom and the hopper lift mechanism may be concurrently used by maintenance workers to supply electrical energy needed to operate any electrically based power tools.

Known apparatuses do not meet all of the aforementioned needs required by maintenance workers whose responsibilities include the care and maintenance of parking lots, sidewalks, pathways, lawns, and other related landscaping needs at city parks, schools, business parks, golf courses and ranges, and office complexes.

BRIEF SUMMARY OF THE INVENTION

The present invention to be disclosed herein is for a trailer that is battery powered and of such a weight that it may be towed by either a traditional gas powered vehicle, maintenance cart, or ATV. The trailer contains a main broom for sweeping the ground beneath as well as a gutter broom for moving debris from alongside the trailer so that the debris is subsequently brushed up by the main broom into the hopper. The hopper has both a lower and upper opening. The lower opening allows for debris swept up by the main broom to enter the hopper while the upper opening allows for maintenance workers to deposit a variety of material within the hopper for transport. The material may range from waste material such as litter, debris, plant trimmings, and unwanted soil to desired materials such as fertilizers, treated soils, construction goods, plants, and tools. The hopper is of such a design so that when tilted to dispose of material contained within the hopper, the material may be deposited into a structure enclosed by walls such as a dumpster or directly onto the ground itself. Finally the power source used to operate the brooms and lift the hopper may also be used to supply the electrical requirements of any electrically driven power tools such as blowers, trimmers, circular saws, and the such.

The trailer of the present invention is of such a size and weight that it may be towed by virtually any street vehicle with a hitch from one job site to another. Once on a job site it may be towed from one area of the job site to another by a maintenance cart or ATV. The trailer of the present invention is of such a width that it may be easily maneuvered through narrow gates and passage areas.

The main broom of the trailer of the present invention may be adjusted both in the speed of rotation and its distance from the surface of the ground below the trailer. The main broom may be adjusted to such a height that would be proper when towing the trailer from one work area to another. The main broom may also be adjusted to such a height and with such a rotational speed so that when the trailer is passed over delicate lawn areas leaves and other small lightweight debris may be picked up without damage to the lawn. The main broom may also be adjusted to such a height and with such a rotational speed so that when the trailer is passed over harder surfaces such as pavement or pathways larger debris such as rocks and other discarded items may be picked up. Furthermore the height and rotation speed may be varied at any point so as to provide the appropriate amount of force when cleaning a surface. Like the main broom, the gutter broom is also fully adjustable in terms of rotational speed and height from the surface to provide similar sweeping abilities as does the main broom. Additionally just as the main broom may be raised to a stowed position when not in use likewise the gutter broom may be raised to a stowed when not in use.

The hopper of the trailer of the present invention contains two entrances that may be opened or closed independently of each other. One entrance allows material picked up by the main broom to enter the hopper and is located where the main broom meets the hopper. This entrance, or the entire hopper itself, may be embellished by a dust suppression system to reduce the amount of dust that may be expelled into the atmosphere by the action of the main broom. The second entrance is the top of the hopper and allows a maintenance worker to load the hopper with material that is to be transported elsewhere and deposited. Moreover the hopper is of such geometric shape and hinged to the trailer's frame in such a manner so that when tilted any material contained within the hopper may be deposited directly onto the ground or into a structure surrounded by walls such as a dumpster that is commonly found in city parks, schools, business parks, golf courses and ranges, and office complexes. The hopper is also lifted by an electrical actuator to such an angle so as to facilitate the removal of any material contained within the hopper.

Finally the trailer of the present invention is environmentally friendly as it is powered by batteries. When operating as a sweeper the trailer is extremely quiet. This allows the trailer to sweep parking lots and pathways in noise sensitive areas such as schools and office complexes without disturbing the work being performed by students and employees. During breaks the trailer may be parked close to a power outlet for charging as the trailer contains the necessary electronics to convert alternating current (AC) power to direct current (DC) power to replenish the power stored within the batteries. Additionally the trailer is equipped with a DC to AC power converter so that the batteries may be used to power any of the many electrically based power tools and equipment currently available on the market. By using electrically based power tools maintenance workers may perform their duties with fewer disturbances to those about them than if they were to use gasoline based equipment. By having an AC power outlet maintenance workers may use the batteries within the trailer to charge batteries used with small power tools such as drills and saws or to power the tools themselves.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and accompanying drawings, wherein.

DETAILED DESCRIPTION OF THE INVENTION

The following description of the preferred embodiment(s) is merely exemplary in nature and is in no way intended to limit the invention, its application, or uses.

Figure 1:
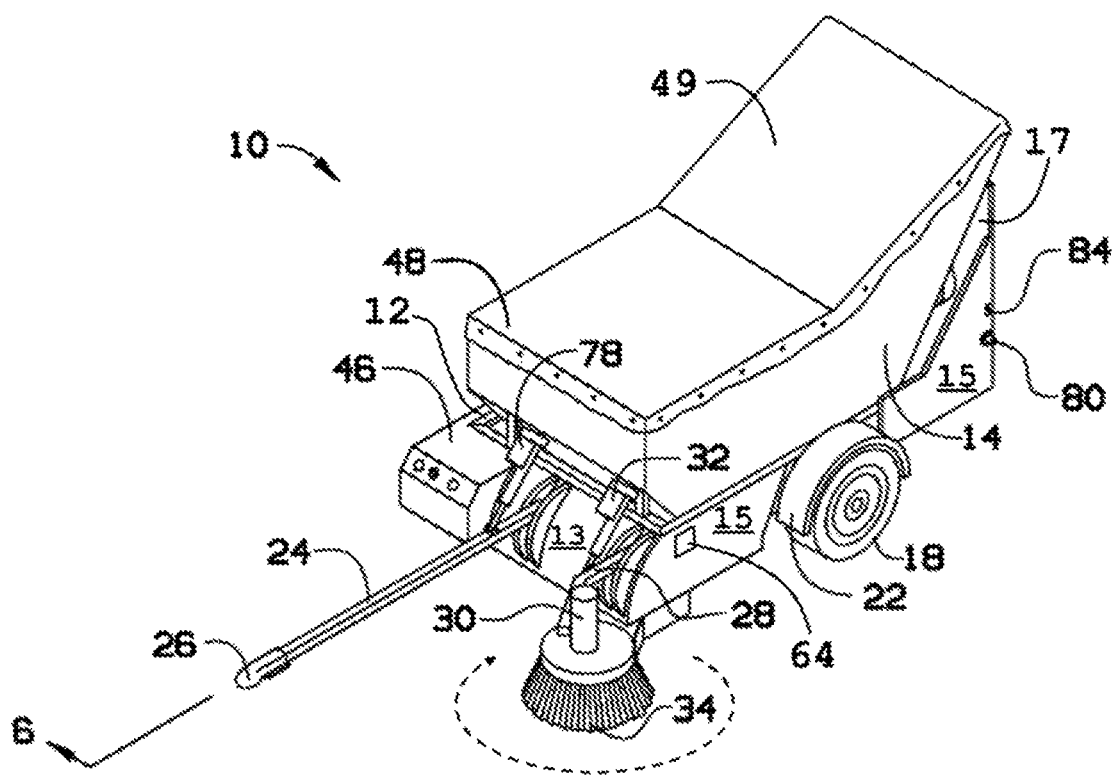
FIG. 1 shows a front left perspective view of the trailer of the present invention with the hopper being covered and the gutter broom in it deployed position.

FIG. 1 shows a front left perspective view of the trailer of the present invention hereafter to be called Green Sweep 10. Green Sweep 10 is powered by a self-contained electrical source, is of such size and weight as to be easily maneuvered over a variety of terrain both flat and uneven as well as hard and soft, capable of transporting and disposing of a significant amount of material, and is designed to share its electrical power source with tools and equipment that require 120 volts of AC. Green Sweep 10, being electrically powered, is environmentally friendly and extremely quiet. Tow vehicle 6 may be virtually any sort of vehicle as Green Sweep 10 is lightweight weighing at 1,950 pounds. In addition Green Sweep 10 is very maneuverable and able to move through tight spaces as it is about 107 inches in length and 66 inches in width. Green Sweep 10 may carry within hopper 14 up to 8,000 pounds of weight which will require that tow vehicle 6 have the appropriate towing capacity. Connecting tow vehicle 6 to Green Sweep 10 is ball hitch 26 mounted at the end of tow tongue 24. Electrical connections between tow vehicle 6 and Green Sweep 10 control tail lights 62 so that Green Sweep 10 may be towed on public streets. Green Sweep 10 is built on rectangular frame 12 with front panel 13, side panels 15, and rear panel 17 and rides on wheels 18. Front panel 13 angles outwardly from frame 12 to accommodate main broom 36. Side panels 15 are mounted vertically to frame 12. Rear panel 17 is also mounted vertically to frame 12 but extends much higher than frame 12. Hopper 14 is attached to rear panel 17 by hinge 50 so that when hopper 14 is lifted it will rotate along the longitudinal axis of the top of rear panel 17. Fenders 22 prevents mud and other debris thrown up by the rotation of wheels 18 from making contact with frame 12 or hopper 14 and thereby degrading the appearance of Green Sweep 10. Above frame 12 is hopper 14 which is of such a geometric shape and is hinged along the top of rear panel 17 so as to allow material within hopper 14 to be deposited into a container with supporting walls, such as a dumpster, when hopper 14 is fully lifted. Hopper 14 does not have a permanent cover so that material may be deposited within hopper 14 by maintenance workers utilizing Green Sweep 10. However hopper 14 may be covered by both front hopper cover 48 and rear hopper cover 49 or by a single cover that is a combination of front hopper cover 48 and rear cover 49. The cover may be of sturdy fabric or of a metallic source and front hopper cover 48 may be of one material while rear hopper cover 49 of another. In addition if a single metallic cover comprising of both front hopper cover 48 and rear hopper cover 49 is to be used then the single metallic cover may be hinged at the junction of front hopper cover 48 and rear hopper cover 49 so as to allow the portion covered by front hopper cover 48 to be opened or the portion covered by rear hopper cover 49 to be opened. As Green Sweep 10 does not create a vacuum within hopper 14 during sweeping operations it is not essential that front hopper cover 48 and rear hopper cover 49 be in place during sweeping operations or that front hopper cover 48 and rear hopper cover 49 provide a vacuum seal when fitted to hopper 14. Attached to frame 12 by gutter broom arm 28 is gutter broom 34. Gutter broom arm 28 may be lifted by gutter broom adjustment actuator 32 and move gutter brush 34 into a stowed position while Green Sweep 10 is not operating as a sweeper. When Green Sweep 10 is operating as a sweeper gutter broom arm 28 may be lowered by gutter broom adjustment actuator 32 and move gutter brush 34 into a deployed position. When deployed, gutter broom 34 rotates in such a direction so as to sweep debris found on the left side of Green Sweep 10 into the path of main broom 36. Gutter broom 34 rotates under the power of gutter broom motor 30. Side light 64 illuminates the area being brushed by gutter broom 34 so that the operator of Green Sweep 10 may verify that gutter broom 34 has been lowered sufficiently enough to provide the proper amount of brushing action to move debris onto the path of main broom 36. Opposite of gutter broom 34 is motor cover/control unit 46, a housing that covers main broom motor 44 and also contains switches and controls for the various actuators and power controls needed to operate Green Sweep 10. Main broom adjustment actuator 78 controls the distance of main broom 36 from the surface. Main broom 36 may be lifted by main broom adjustment actuator 78 so as to move main broom 36 into a stowed position while Green Sweep 10 is not operating as a sweeper. When Green Sweep 10 is operating as a sweeper main broom 36 may be lowered by main broom adjustment actuator 32 so as to move main broom 36 into a deployed position. When deployed, main broom 36 rotates in a direction opposite to the movement of Green Sweep 10 so as to lift debris along its path through sweeper door 88 and into hopper 14. Main broom 36 rotates under the power of main broom motor 44. Green Sweep 10 contains inverter 58 so that DC electrical power stored in batteries 52 may be converted into AC power in order to operate any one of a wide variety of AC powered tools or equipment such as drills, saws, blowers, mowers, trimmers, and the such. Maintenance workers may access AC power by plugging the AC powered tool or equipment into retractable AC cord 80 and then activating inverter 58 by positioning control switch 84 to the "on" position. Once the AC powered tool or equipment is no longer needed the maintenance worker will unplug the AC powered tool or equipment from retractable AC cord 80 and then deactivate inverter 58 by positioning control switch 84 to the "off" position.

Figure 2:
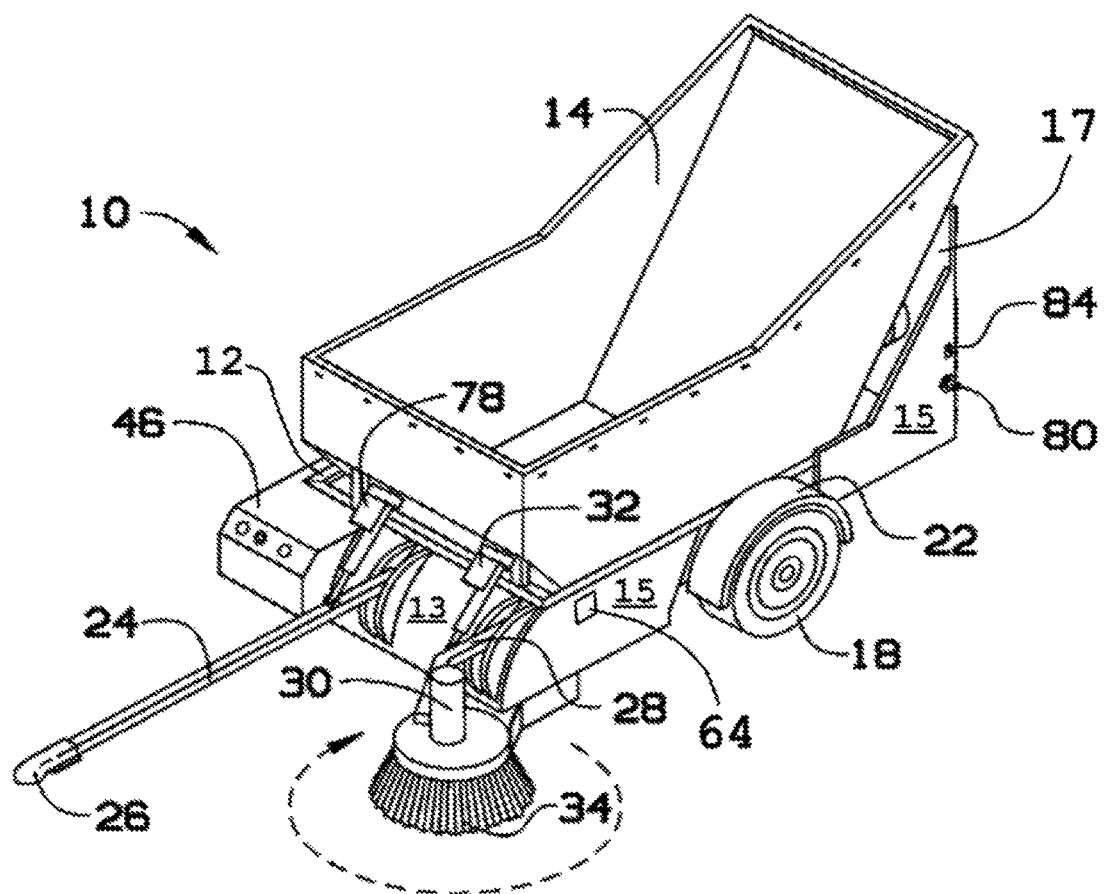
FIG. 2 shows a front left perspective view of the trailer of the present invention with the hopper being uncovered and the gutter broom rotating in its deployed position.

FIG. 2 shows a front left perspective view of Green Sweep 10 with front hopper cover 48 and rear hopper cover 49 removed from hopper 14. Hopper 14 is connected to rear panel 17 by hinge 50 so that when hopper 14 is raised it will pivot about the longitudinal axis at the top of rear panel 17. Hinge 50 is about 80 inches above the surface. When hopper 14 is at its maximum raised position the rear edge of hopper 14 is also about 80 inches above the surface. As common dumpsters have walls ranging from 48 to 60 inches in height, material in hopper 14 may be deposited directly into a dumpster. This design saves time and effort by the maintenance worker as they are not required to lift material out of hopper 14 and into a dumpster.

Figure 3:
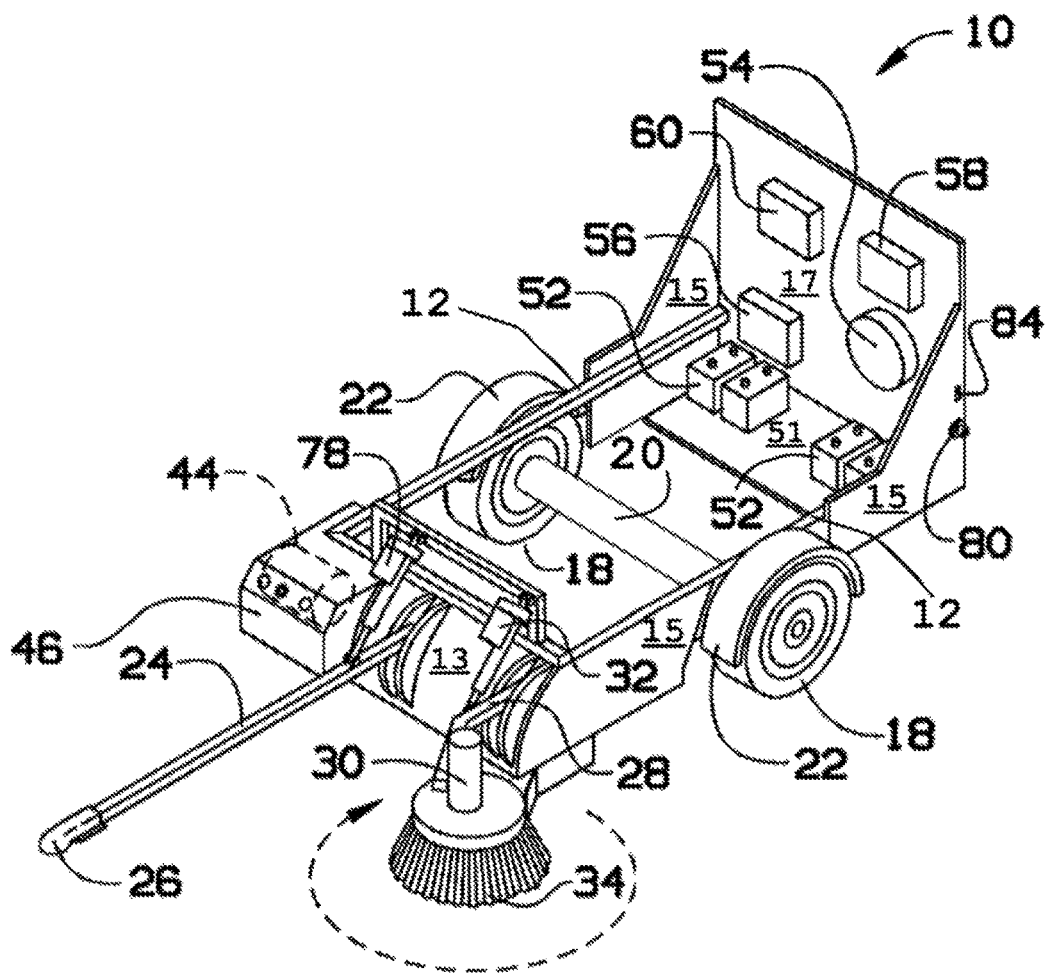
FIG. 3 shows a front left perspective view of the trailer of the present invention with the hopper being removed revealing the electronics installed in the trailer, location of the electrical motor, and the gutter broom rotating in its deployed position.

FIG. 3 shows a front left perspective view of Green Sweep 10 with hopper 14 removed exposing additional components residing below hopper 14. Hidden behind motor cover/control unit 46 is main broom motor 44 that is used to rotate main broom 36. Motor cover/control unit 46 also provides access to switches used to raise and lower main broom 36, gutter broom 34, and hopper 14 as well as switches to turn on or off main broom motor 44 and gutter broom motor 30. Also displayed on motor cover/control unit 46 is a meter showing the amount of electrical storage currently held by batteries 52. Batteries 52, mounted to platform 51, are preferably 24 volt lithium phosphate or lead acid but other similar types of batteries may be used depending upon need and technological advancement. Also exposed behind hopper 14 and mounted to rear panel 17 is battery charger 56, motor controller 60, inverter 58, and AC cord reel 54. Battery charger 56 converts AC current into DC current for use in recharging batteries 52 when Green Sweep 10 is connected to an AC power source. Motor controller 60 is used to control the rotational speed of main broom motor 44. The rotational speed of main broom 36 may be lowered to accommodate sweeping lawns or other surfaces that are more delicate or where only light debris need to be swept. Increasing the rotational speed of main broom 36 is effective in sweeping heavier debris that may be found on paved surfaces such as parking lots. Inverter 58 is used to convert DC energy stored in batteries 52 into AC energy to operate various AC power tools and equipment that may be found on the market today. Examples of AC power tools that may be operated by connecting to Green Sweep 10 include but is not limited to drills, miter saws, table saws, circular saws, sanders, polishers, grinders, jointers, planers, metal shears, nailers, routers, and more. Examples of AC powered equipment that may be operated by connecting to Green Sweep 10 include but is not limited to trimmers, blowers, pole saws, edgers, chain saws, pressure washers, log splitters and more. AC cord reel 54 contains a length, preferably 50 feet, of electrical power cord that may be used to connect the various power tools and equipment to Green Sweep 10. To support and isolate frame 12 from vibrations caused when Green Sweep 10 is maneuvered over uneven surfaces torsion spring axle 20 dampens such vibrations. Other spring systems such as leaf springs 20 shown in FIG. 4 may also be used to dampen vibrations created when Green Sweep 10 passes over uneven surfaces.

Figure 4:
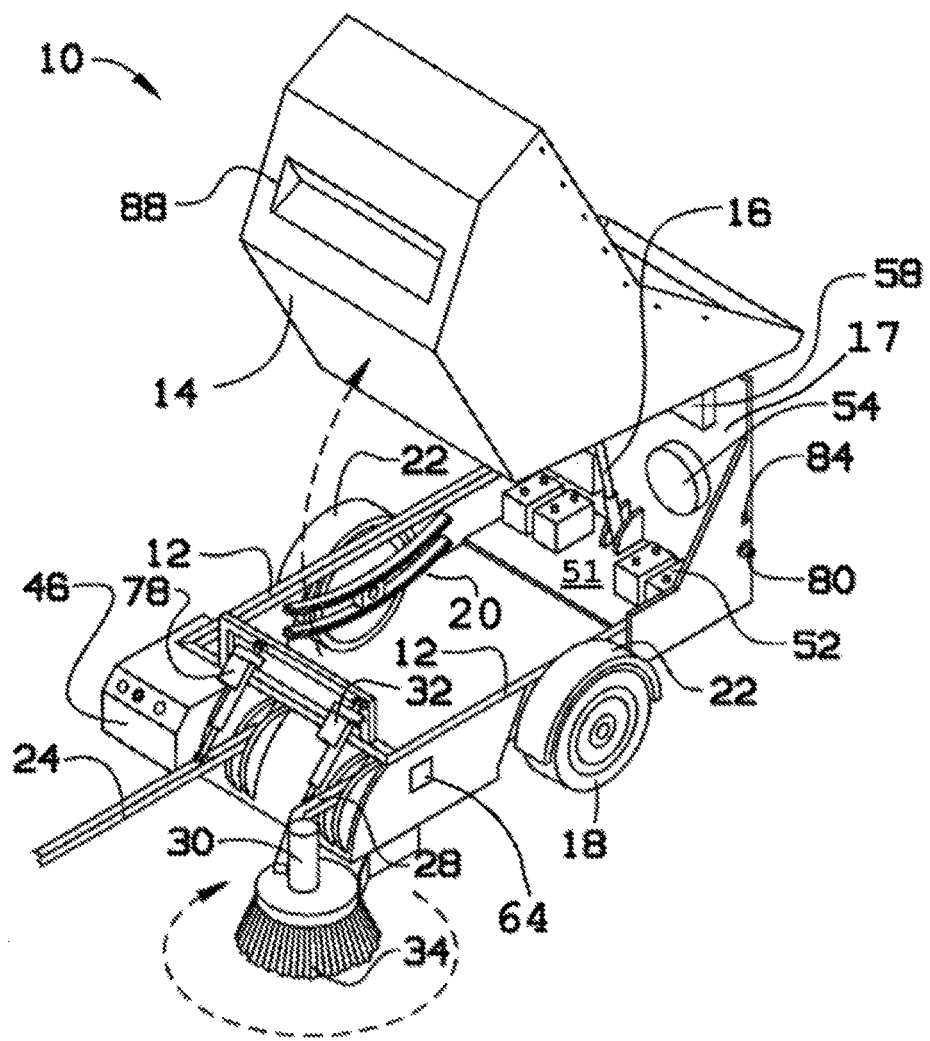
FIG. 4 shows a front left perspective view of the trailer of the present invention with the hopper being uncovered and in its lifted position so that the opening in the hopper that allows debris caught by the main broom to pass into the hopper is visible as well as the gutter broom rotating in its deployed position.

FIG. 4 shows a front left perspective view of Green Sweep 10 with hopper 14 in its maximum raised position above rear panel 17. When hopper 14 is at its maximum raised position the rear edge of hopper 14 is about 80 inches above the surface. As common dumpsters have walls ranging from 48 to 60 inches in height, material in hopper 14 may be deposited directly into a dumpster. When operating as a sweeper the rotational movement of main broom 36 is controlled by motor controller 60. The rotational movement must be of such speed that debris swept up by main broom 36 is thrown into hopper 14 through sweeper door 88. When Green Sweep 10 is being used simply to transport material sweeper door 88 may be closed to prevent material within hopper 14 from escaping through sweeper door 88. To raise and lower hopper 14 hydraulic actuator 16 may be activated by a switch located on motor cover/control unit 46. To support and isolate frame 12 from vibrations caused when Green Sweep 10 is maneuvered over uneven surfaces leaf springs 20 are used to dampen such vibrations. Other spring systems such as torsion spring axle 20 shown in FIG. 3 may also be used to dampen vibrations created when Green Sweep 10 passes over uneven surfaces.

Figure 5:
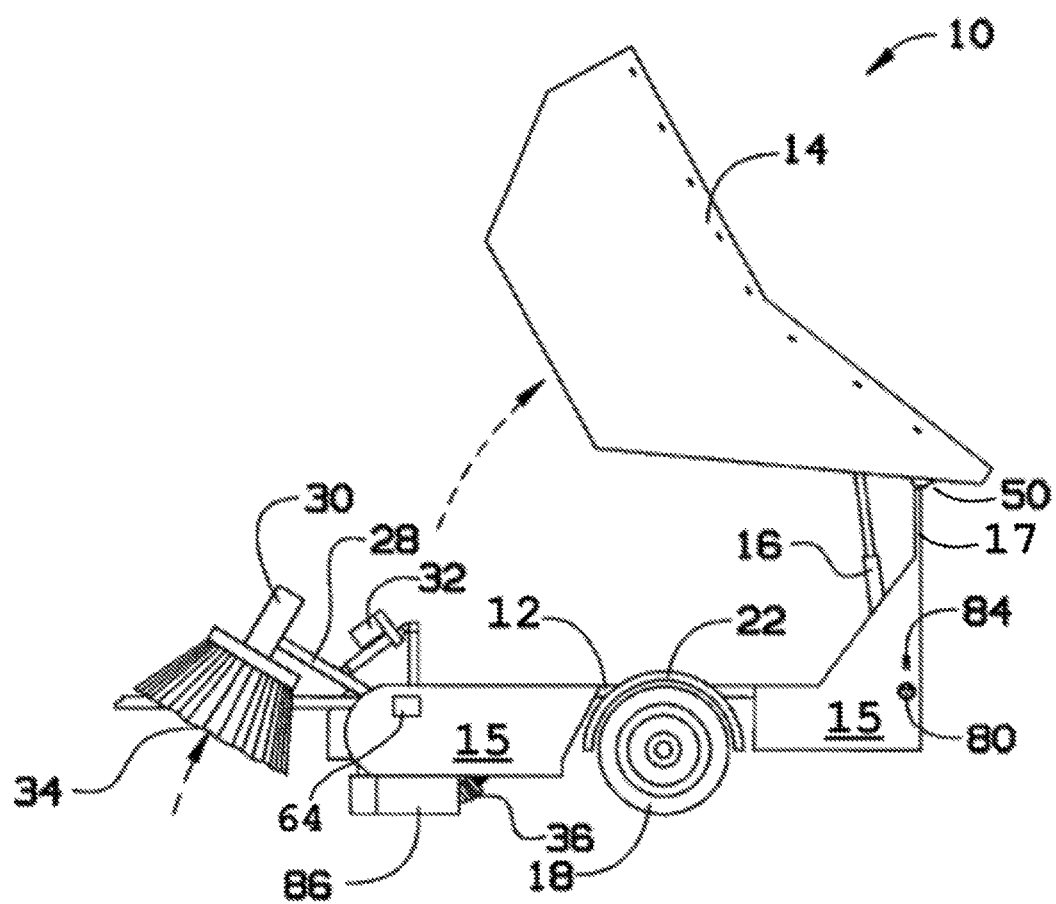
FIG. 5 shows a left side view of the trailer of the present invention with the hopper being in its lifted position and the gutter broom in its stowed position.

FIG. 5 shows a left side view of Green Sweep 10 with hopper 14 in its maximum raised position above rear panel 17. When hopper 14 is at its maximum raised position the rear edge of hopper 14 is about 80 inches above the surface.

As hopper 14 is raised by hydraulic actuator 16 hopper 14 will pivot about hinge 50 found at the top of rear panel 17. Similar trailers with hoppers traditionally do not have a rear panel 17 and rotate hopper 14 about the rear of frame 12 and position the actuator used to lift the hopper close to the front of frame 12. This arrangement maximizes the lifting capabilities of the actuator while at the same time minimizing the amount of expansion required by the actuator in order to tilt the hopper to an angle where material contained within the hopper may be easily remove by gravitational forces. However if the hopper is hinged along the top of rear panel 17, as shown here, then a traditionally placed actuator would have to expand to such a length that the structural integrity of the actuator may be compromised or that the actuator would be more costly. Green Sweep 10 places the actuator for hopper 14, hydraulic actuator 16, on platform 51. Such placement does limit the amount of weight that may be lifted but provides for two important advantages. First is that the amount of expansion required by hydraulic actuator 16 in order to tilt hopper 14 to an angle where material contained with hopper 14 may be easily removed by gravitational forces is minimized. Second is that the cost of hydraulic actuator is reduced as it may be smaller than a traditionally placed actuator. Additionally FIG. 5 shows gutter broom 34 in its stowed position appropriate when gutter broom is not in use. Finally skid shoe 86 exists at both sides of main broom 36 and along the front of main broom 36 to increase the amount of debris that is caught by main broom 36 rotational movement and thrown into hopper 14 through sweeper door 88.

Figure 6:
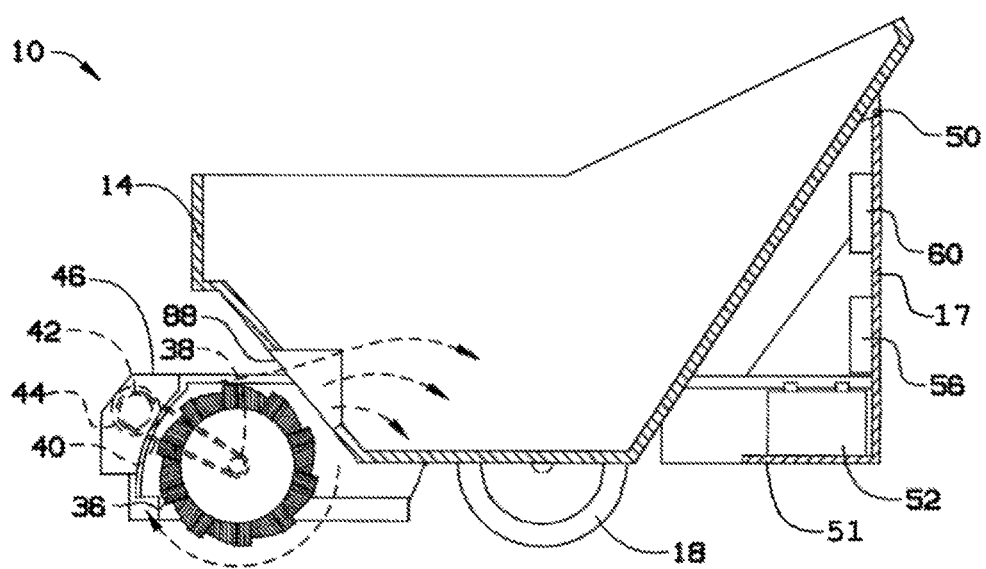
FIG. 6 shows a left side cut away view of the trailer of the present invention with the hopper in its resting position and showing the rotation of the main broom and the passage of debris caught by the main broom through an opening in the hopper.

FIG. 6 shows a left side cut away view of Green Sweep 10 with hopper 14 in its resting position. In addition, the rotational movement of main broom 36 is shown. The rotational movement of main broom 36 is opposite of the rotational movement of wheels 18 when Green Sweep 10 is being used as a sweeper. This causes debris to be kicked up by main broom 36 rotational movement to pass through sweeper door 88 and into hopper 14. Main broom motor 44 is connected to main broom 36 by drive belt 42 that loops about main broom motor 44 and drive shaft 38. About main broom 36 is housing 40 that is used to guide debris kicked up by main broom 36 through sweeper door 88 and into hopper 14. FIG. 6 also shows platform 51 where batteries 52 may be found as well as rear panel 17 containing hinge 50 joining hopper 14 to rear panel 17 and allowing hopper 14 to rotate about the longitudinal axis of the top of rear panel 17 when raised.

Figure 7:
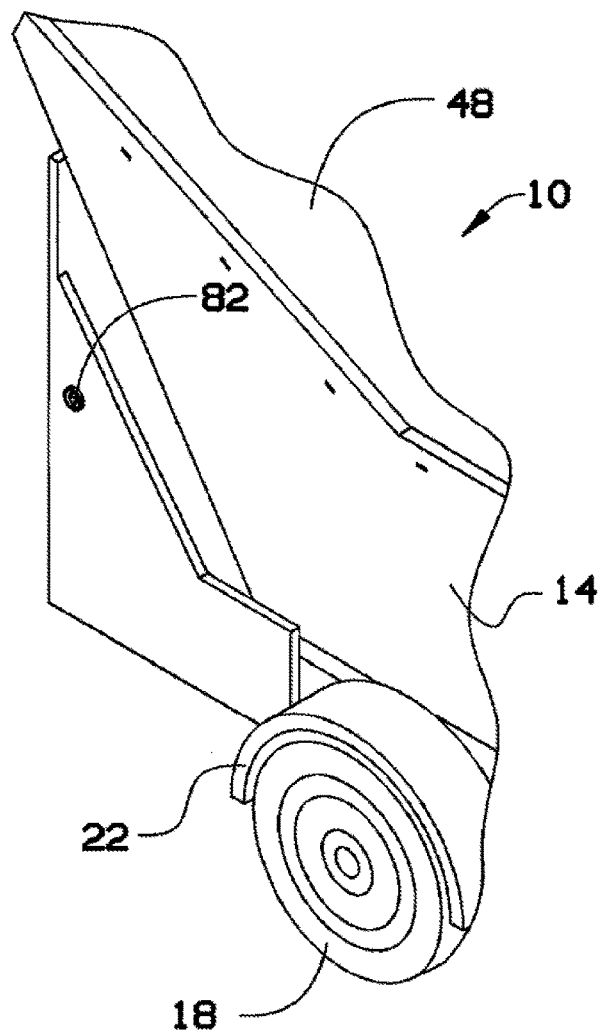
FIG. 7 shows a perspective view of the rear right of the trailer of the present invention revealing the AC charging port for the batteries.

FIG. 7 shows a perspective view of the right rear of Green Sweep 10 revealing AC charging port 82 for batteries 52.

Figure 8:
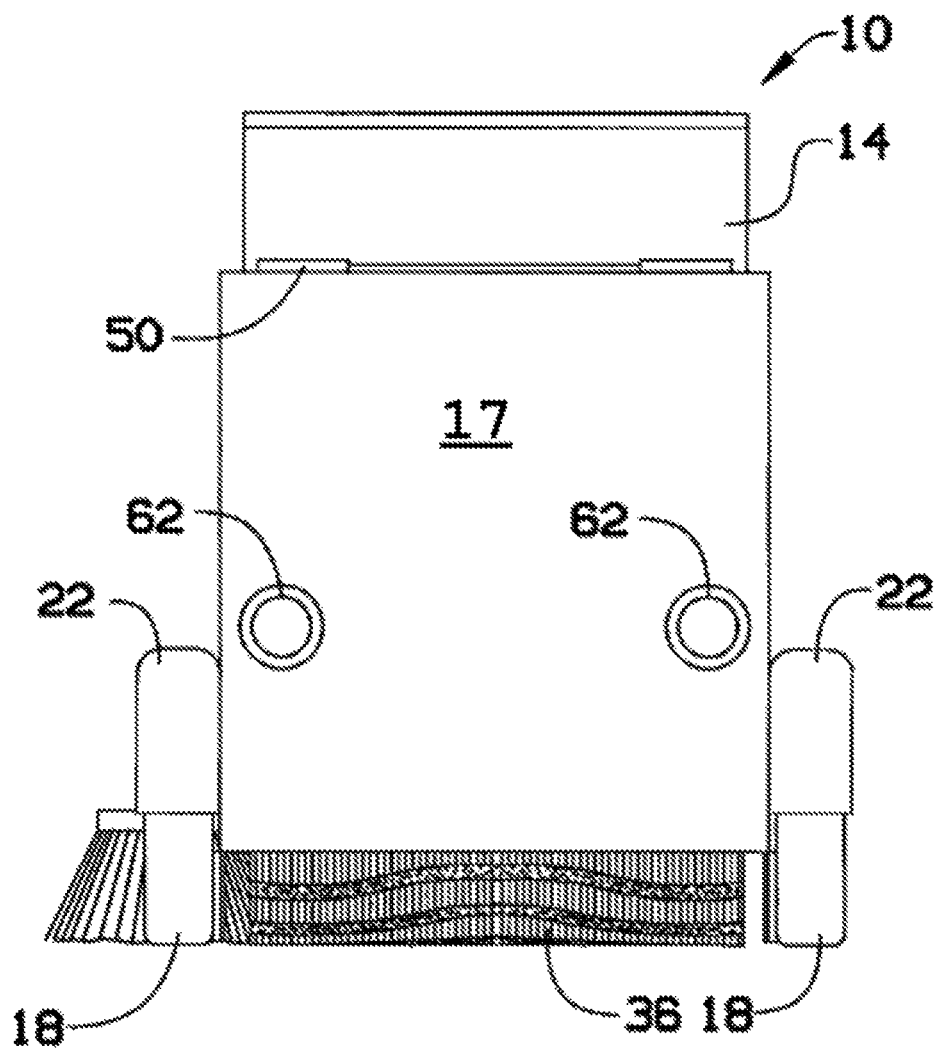
FIG. 8 shows the rear of the trailer of the present invention with the main broom and the gutter broom both in their deployed position.

FIG. 8 shows the rear of Green Sweep 10 with main broom 36 and gutter broom 34 both in their deployed position for sweeping. Tail lights 62 are controlled by tow vehicle 6 when Green Sweep 10 is being towed. Hinge 50 joins hopper 14 to rear panel 17 allowing hopper 14 to rotate about the longitudinal axis of the top of rear panel 17 when being raised or lowered.

Figure 9:
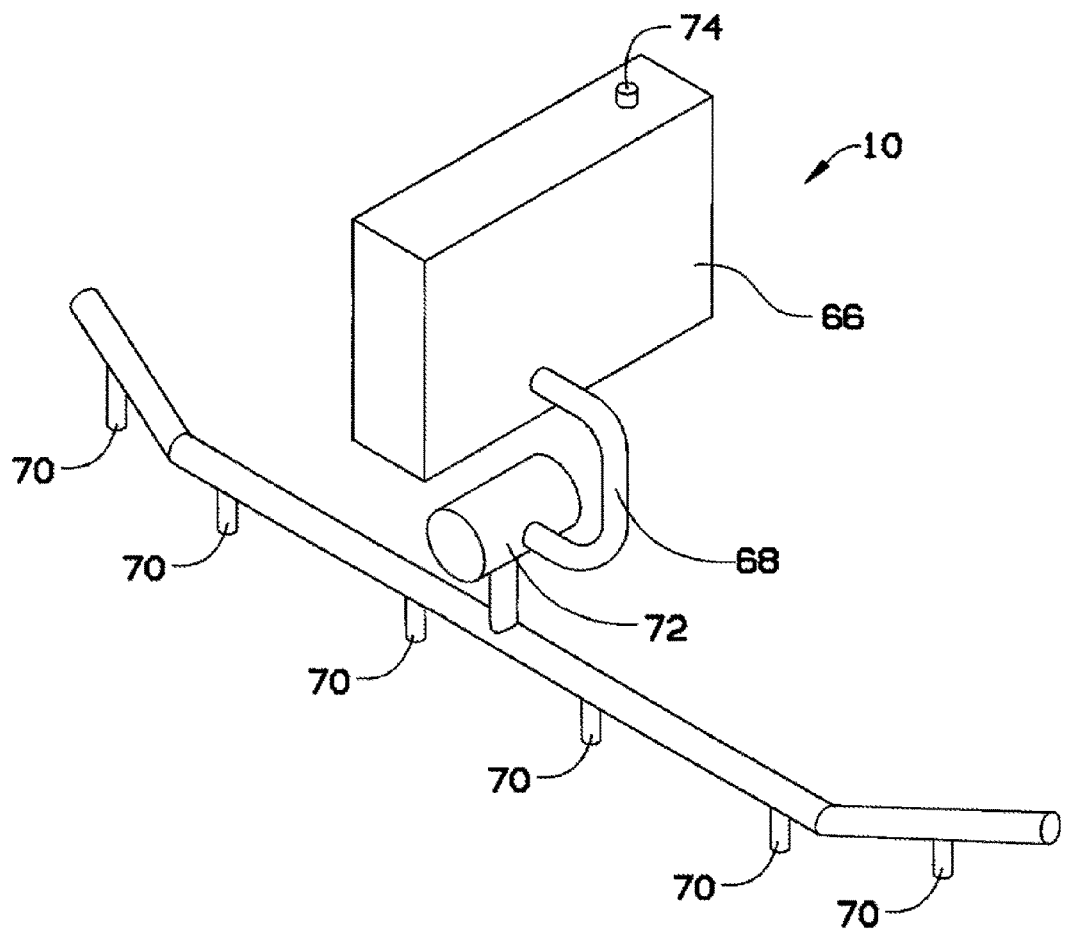
FIG. 9 shows the dust suppression system present within the hopper that when activated will reduce the amount of dust that is able to escape from the hopper and into the atmosphere.

FIG. 9 shows the dust suppression system present within hopper 14 that when activated will reduce the amount of dust that is able to escape from hopper 14 and into the atmosphere. Such a system is useful to reduce the amount of dust produced by main broom 36 when Green Sweep 10 is functioning as a sweeper in a location where humans are close by. Whenever main broom 36 is turned on so will water pump 72 be turned on. Likewise when main broom 36 is turned off so will water pump 72 be turned off. When water pump 72 is turned on water will be drawn from tank 66 though hose 68 into water pump 72 and expelled through atomizers 70.

Figure 10:
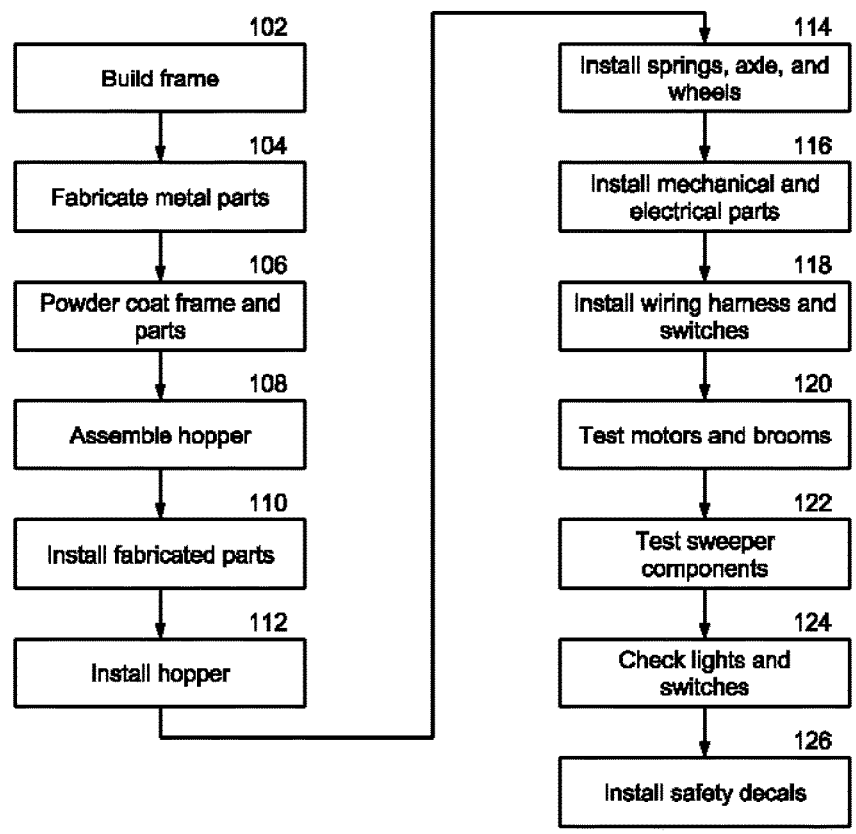
FIG. 10 shows a flowchart identifying the steps in assembling the trailer of the present invention.

FIG. 10 shows a flowchart identifying the steps in assembling Green Sweep 10. The procedure is straight forward and begins with step 102 to build frame 12. Next is step 104 which is to fabricate all of the metal parts. Step 104 may be performed concurrently with step 102. Next is step 106 where metal parts fabricated in step 104 and frame 12 is powder coated. Next is step 108 where hopper 14 is assembled. Next is step 110 where the parts fabricated in step 104 is installed onto frame 12 and hopper 14. Next is step 112 where hopper 14 is installed onto frame 12. Next is step 114 where torsion spring axle 20 and wheels 18 are installed onto frame 12. Next is step 116 where mechanical and electrical parts, motors, and brooms are installed onto frame 12. Next is step 118 where wiring harness and switches are installed. Next is step 120 where motors and brooms are tested and replaced if necessary. Next is step 122 where sweeper components are tested and replaced if necessary. Next is step 124 where lights and switches are tested and replaced if necessary. Finally is step 126 where safety decals are installed.

What is claimed is:

1. A towable trailer comprising:
   a rectangular frame with front, rear, left, and right sides supported by wheels mounted on its left and right sides and touching a road surface;
   a towing assembly mounted to front of said frame for towing said trailer;
   a rectangular rear panel attached perpendicular to and along rear edge of said frame with the bottom of said rear panel proximate to said frame and the top of said rear panel at least 60 inches above said road surface;
   a hopper with front, rear, left, right, and bottom planes suitable for holding material and occupying space above and resting on said frame;
   a hinging means attached to the top edge of said rear panel that mates with hinging means attached to the rear of said hopper allowing said hopper to rotate about the longitudinal axis of the top edge of said rear panel;
   a platform adjoining rear, left and right sides of said frame;
   an energy source; and
   an actuator with two opposing ends with a first end attached to said platform and a second end attached to said hopper and powered by said energy source for rotating said hopper about said hinging means to such an angle so that said material is easily removed from said hopper.

2. The towable trailer of claim 1 further comprising a cylindrical broom assembly mounted within said frame and perpendicular to said right and left sides of said frame and traversing substantially the entire distance between said right and left sides of said frame and a motor utilizing energy from said energy source to cause said cylindrical broom to rotate for the purpose of collecting debris from the surface beneath said trailer while said trailer is being towed and propelling the debris through an opening in said hopper for temporary storage.

3. The towable trailer of claim 2 further comprising a gutter broom assembly mounted at front left corner of said frame and extending some distance therefrom and a motor utilizing energy from said energy source to cause said gutter broom to rotate horizontally to brush debris present on left side of said trailer onto the path of said cylindrical broom.

4. The towable trailer of claim 1 wherein said energy source are batteries.

5. The towable trailer of claim 4 further comprising an inverter to convert energy stored in said batteries to alternating current and an electrical power cord capable of conducting said alternating current to operate tools or equipment.

6. The towable trailer of claim 1 further comprising a removable cover for said hopper consisting of a forward segment and a rear segment the two segments being hinged together such that one segment may be opened while the other segment is closed or both segments are closed.

* * * * *